(12) United States Patent
Kariniemi et al.

(10) Patent No.: US 8,146,233 B1
(45) Date of Patent: Apr. 3, 2012

(54) FULL-RAIL SUSPENSION WITH SHEARING FRACTURE DETAB

(75) Inventors: Ryan D. Kariniemi, Cokato, MN (US); Patrick R. LaLonde, Waite Park, MN (US); Ryan B. Sefkow, Spring Park, MN (US)

(73) Assignee: Hutchinson Technology Incorporated, Hutchinson, MN (US)

( * ) Notice: Subject to any disclaimer, the term of this patent is extended or adjusted under 35 U.S.C. 154(b) by 881 days.

(21) Appl. No.: 12/199,322

(22) Filed: Aug. 27, 2008

Related U.S. Application Data

(60) Provisional application No. 60/993,226, filed on Sep. 11, 2007.

(51) Int. Cl.
*B23P 21/00* (2006.01)
(52) U.S. Cl. ....................................... 29/469
(58) Field of Classification Search ............... 29/469, 29/425, 424, 413, 418, 426.4, 426.5, 426.6, 29/603.03, 603.05, 603.06, 603.07; 360/240, 360/244.2
See application file for complete search history.

(56) References Cited

U.S. PATENT DOCUMENTS

| | | | |
|---|---|---|---|
| 5,991,122 A | 11/1999 | Tangren et al. | |
| 6,697,227 B2 | 2/2004 | Kashima et al. | |
| 6,728,072 B1 | 4/2004 | Van Sloun et al. | |
| 6,765,759 B2 | 7/2004 | Bhattacharya et al. | |
| 6,956,721 B1 | 10/2005 | Khan | |
| 7,568,277 B1 * | 8/2009 | Bjorstrom et al. | 29/603.03 |
| 2004/0016277 A1 | 1/2004 | Thaveeprungsriporn | |

* cited by examiner

*Primary Examiner* — John C Hong
(74) *Attorney, Agent, or Firm* — Faegre Baker Daniels LLP

(57) ABSTRACT

A multi-piece head suspension assembly is manufactured from a semi-finished suspension product. The semi-finished suspension product includes a load beam having two side edges, a distal end, and a proximal end opposite the distal end. The semi-finished suspension product also includes a beam carrier strip connected to the proximal end by one or more tabs. Each tab includes a detaching region that has a lower shear strength than other regions of the tab. Rails are formed on the side edges of the load beam, and the semi-finished suspension product is attached to a hinge assembly at the proximal end of the load beam. A shear load is applied to the one or more tabs to cause the one or more tabs to fracture at the detaching region.

18 Claims, 8 Drawing Sheets

FULL-RAIL SUSPENSION WITH SHEARING FRACTURE DETAB

CROSS-REFERENCE TO RELATED APPLICATION(S)

The present application claims the benefit of U.S. Provisional Application No. 60/993,226 filed Sep. 11, 2007, entitled "Full-Rail Forming Via Shearing Fracture Detab," which is incorporated by reference in its entirety.

TECHNICAL FIELD

The present invention relates generally to integrated lead suspensions of the type used in magnetic disk drives or other dynamic data storage systems. More particularly, the present invention relates to a method for manufacturing a suspension with full side rails.

BACKGROUND

Disk storage device include a head suspension having a load beam for positioning a head slider in close proximity to a rotating disk. In typical applications, the fast spinning disks create aerodynamic forces acting on the head slider and other parts of the head suspension. The uneven disk surfaces cause fluctuations in the aerodynamic forces, which can detrimentally affect the resonance and shock performance of the load beam. In order to reduce the impact of fluctuating aerodynamic forces, rails may be formed over a portion of the load beam proximate the head slider. However, some conventional processes for forming rails involve multiple steps that can damage or deform the load beam.

Head suspension components such as load beams are conventionally manufactured from a semi-finished suspension product. As used herein, the phrase "semi-finished suspension product" refers to a semi-finished product including at least one metal head suspension component integrally connected to a carrier strip, or a carrier strip with at least one intermediate member (e.g., a strut) securing the head suspension components to the carrier strip.

During initial processing, the carrier strip provides a convenient way to handle the components while at the same time permitting access to the individual components for processing and testing. One way each individual component is attached to the carrier strip is by one or more tabs. As used herein, the term "tab" refers to a connecting member that integrally connects the head suspension component and the carrier strip together. At some point in the manufacturing process, it is necessary to separate each individual component from the carrier strip, since the carrier strip and/or the intermediate member would interfere with installation of the individual component in its intended environment (such as mounting on an actuator arm in a disk drive assembly).

When the component is separated from the carrier structure, it is important to avoid mechanically altering the component, since the component typically has been manufactured to precise tolerances for its shape, operating characteristics, and configuration, which, when installed, will result in a desired set of parameters such as offset height, static attitude, gram load, and z-height. Separating the component from the carrier strip must be done in such a way as to avoid affecting these parameters.

SUMMARY

One aspect of the present invention relates to manufacturing a multi-piece head suspension assembly from a semi-finished suspension product. The semi-finished suspension product includes a load beam having two side edges, a distal end, and a proximal end opposite the distal end. The semi-finished suspension product also includes a beam carrier strip connected to the proximal end by one or more tabs. Each tab includes a detaching region that has a lower shear strength than other regions of the tab. Rails are formed on the side edges of the load beam, and the semi-finished suspension product is attached to a hinge assembly at the proximal end of the load beam. A shear load is applied to the one or more tabs to cause the one or more tabs to fracture at the detaching region.

In another aspect, the present invention relates to forming a component in a multi-piece head suspension assembly. A semi-finished suspension product is formed including a load beam and a beam carrier strip. The load beam includes two side edges, a distal end, and a proximal end opposite the distal end, and the beam carrier strip is connected to the proximal end by one or more tabs. Rails are formed on the side edges of the load beam that extend from the distal end to proximate the proximal end. A shear load is then applied to the one or more tabs to cause the one or more tabs to fracture.

While multiple embodiments are disclosed, still other embodiments of the present invention will become apparent to those skilled in the art from the following detailed description, which shows and describes illustrative embodiments of the invention. Accordingly, the drawings and detailed description are to be regarded as illustrative in nature and not restrictive.

Figure 1:
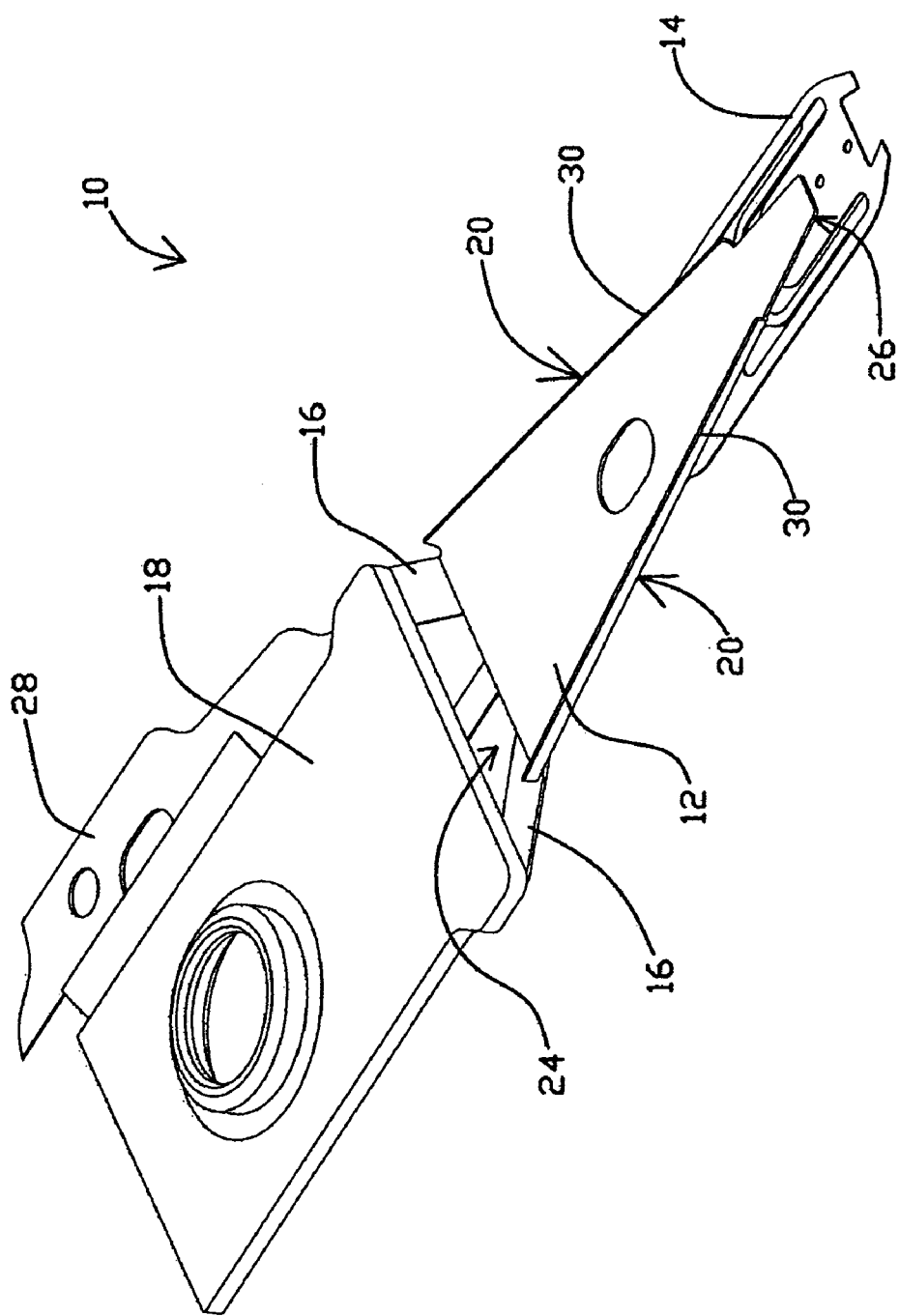
FIG. 1 is a perspective view of a multi-piece head suspension with full length rails in accordance with an embodiment of the present invention.

While the invention is amenable to various modifications and alternative forms, specific embodiments have been shown by way of example in the drawings and are described in detail below. The intention, however, is not to limit the invention to the particular embodiments described. On the contrary, the invention is intended to cover all modifications, equivalents, and alternatives falling within the scope of the invention as defined by the appended claims.

DETAILED DESCRIPTION

FIG. 1 is a perspective view of a 4-piece (i.e., multi-piece) head suspension 10 in accordance with an embodiment of the invention. Suspension 10 includes load beam 12, flexure 14, spring component 16, and base plate 18. Load beam 12 includes side edges 20, proximal end 24, and distal end 26. As shown, flexure 14 is attached to load beam 12 and extends from distal end 26 of the load beam 12. Spring component 16 is attached to proximal end 24 of load beam 12. Base plate 18 is mounted to actuator mounting region 28 on spring component 16.

Head suspension 10 also includes full length rails 30 extending along side edges 20 of load beam 12. As will be described in more detail below, full length rails 30 are formed on side edges 20 in a single step. The level of stiffness provided by full length rails 30 to the thin material of load beam 12 is relatively more than that provided by conventional partial length rails. Accordingly, the resonance and shock performances of load beam 12, and hence of head suspension 10, will be relatively better than that provided by conventional load beam designs. A method for manufacturing head suspension 10 is described herein with regard to FIGS. 2 through 8.

Figure 2:
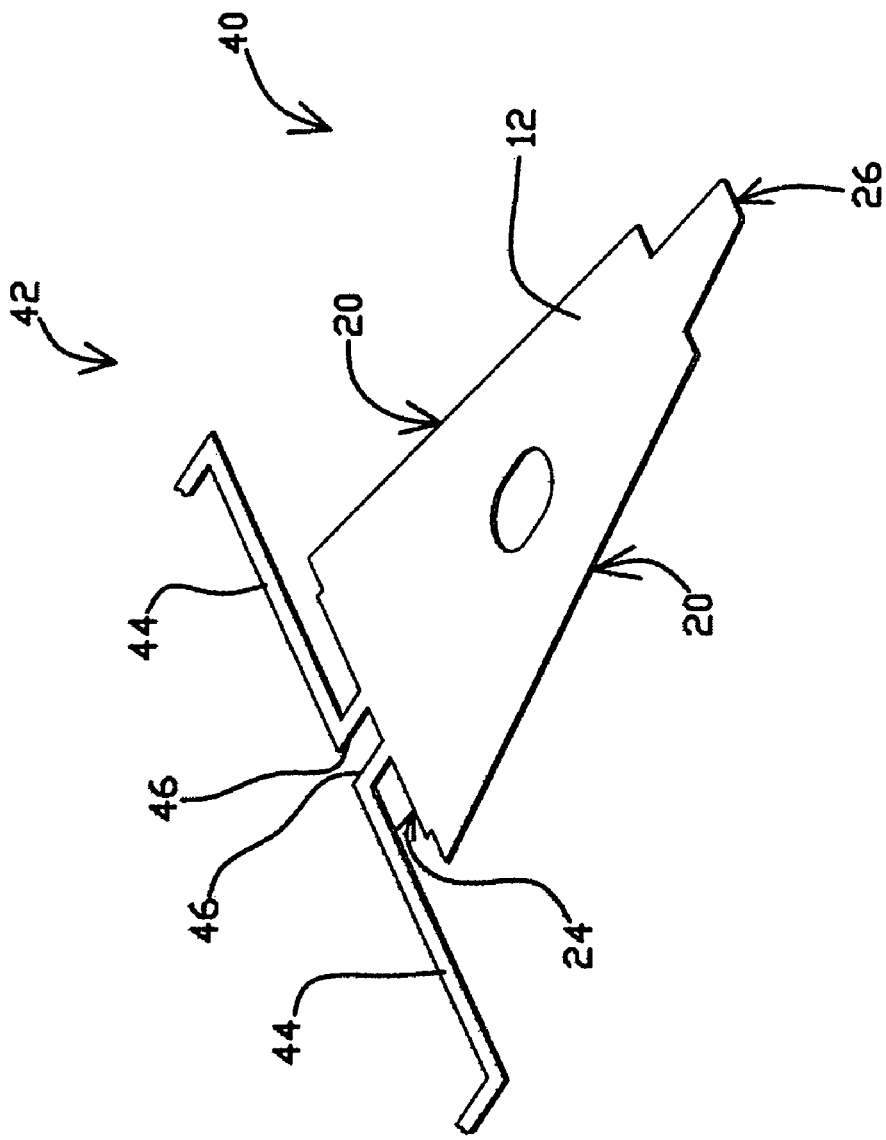
FIG. 2 is a perspective view of a beam component including a load beam and a beam carrier strip manufactured in accordance with the present invention.

FIG. 2 is a perspective view of semi-finished suspension product 40 including load beam 12 and beam carrier strip 42. Beam carrier strip 42 includes arms 44 each connected to proximal end 24 of load beam 12 by tabs 46. Beam carrier strip 42 provides a convenient way to handle load beam 12 during assembly of multi-piece head suspension 10. In the embodiment shown, tabs 46 connect arms 44 to load beam 12 in a central portion of proximal end 24. In other embodiments, tabs 46 may connect arms 44 to proximal end 24 closer to side edges 20, beam carrier strip 42 may include one or more than two arms 44, and/or each arm 44 may be connected to proximal end 24 by more than one tab 46.

Figure 3:
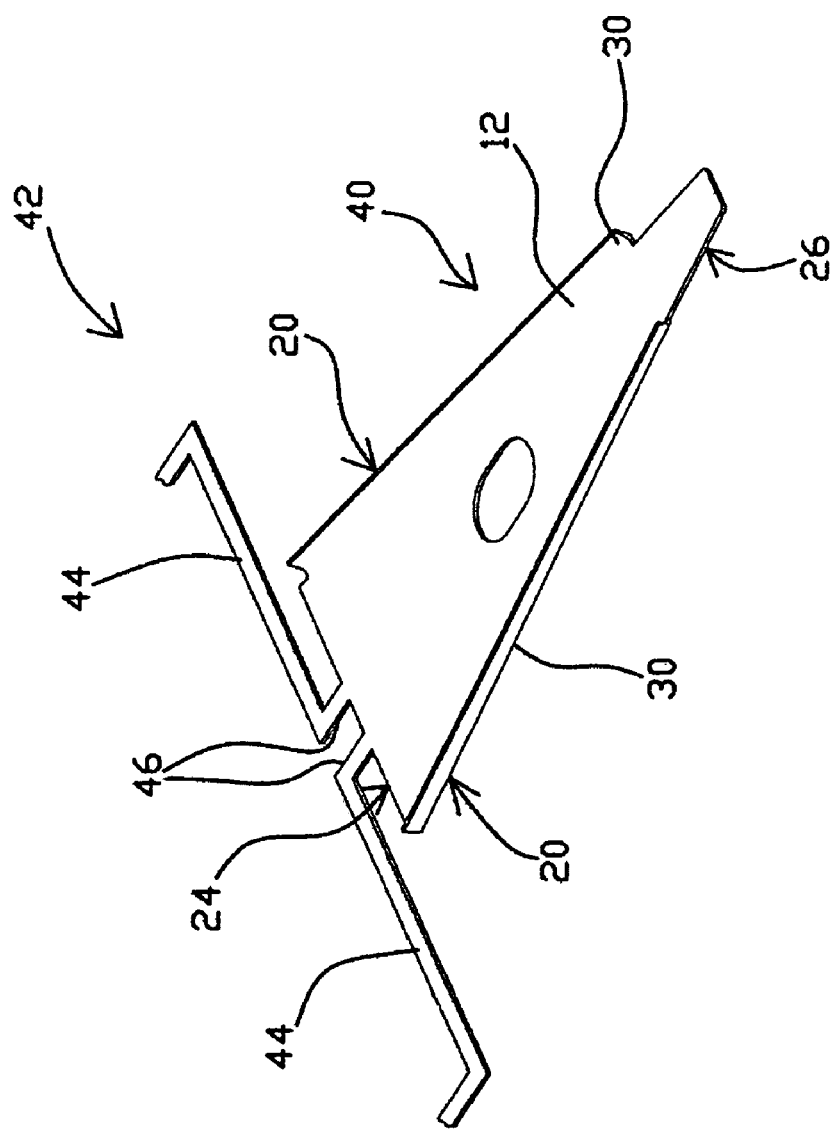
FIG. 3 is a perspective view of the beam component shown in FIG. 2 after full rails are formed on side edges of the load beam.

FIG. 3 is a perspective view of semi-finished suspension product 40 after rails 30 are formed on side edges 20. To form rails 30, semi-finished suspension product 40 may be held in place relative to a manufacturing tool (not shown) by beam carrier strip 42. Side edges 20 may then be bent by the manufacturing tool to form rails 30. Because arms 44 are connected to proximal end 24, side edges 20 are free and may be bent into rails 30 in a single step. Rails 30 are considered "full rails" because they extend from proximal end 24 to proximate distal end 26 (i.e., near the region of load beam 12 to which flexure 14 is attached). By forming rails 30 as full rails, a 10-30% improvement in resonant frequencies of load beam 12 can be obtained, and the shock performance of load beam 12 is improved. In addition, the strain put on load beam 12 is reduced compared to designs in which the beam carrier strip is detabbed from side edges 20 of load beam 12, thereby minimizing undesirable structural and cosmetic impacts to load beam 12 during fabrication. Furthermore, the angle formed between rails 30 and load beam 12 is more easily controllable when rails 30 are formed in a single processing step.

Figure 4:
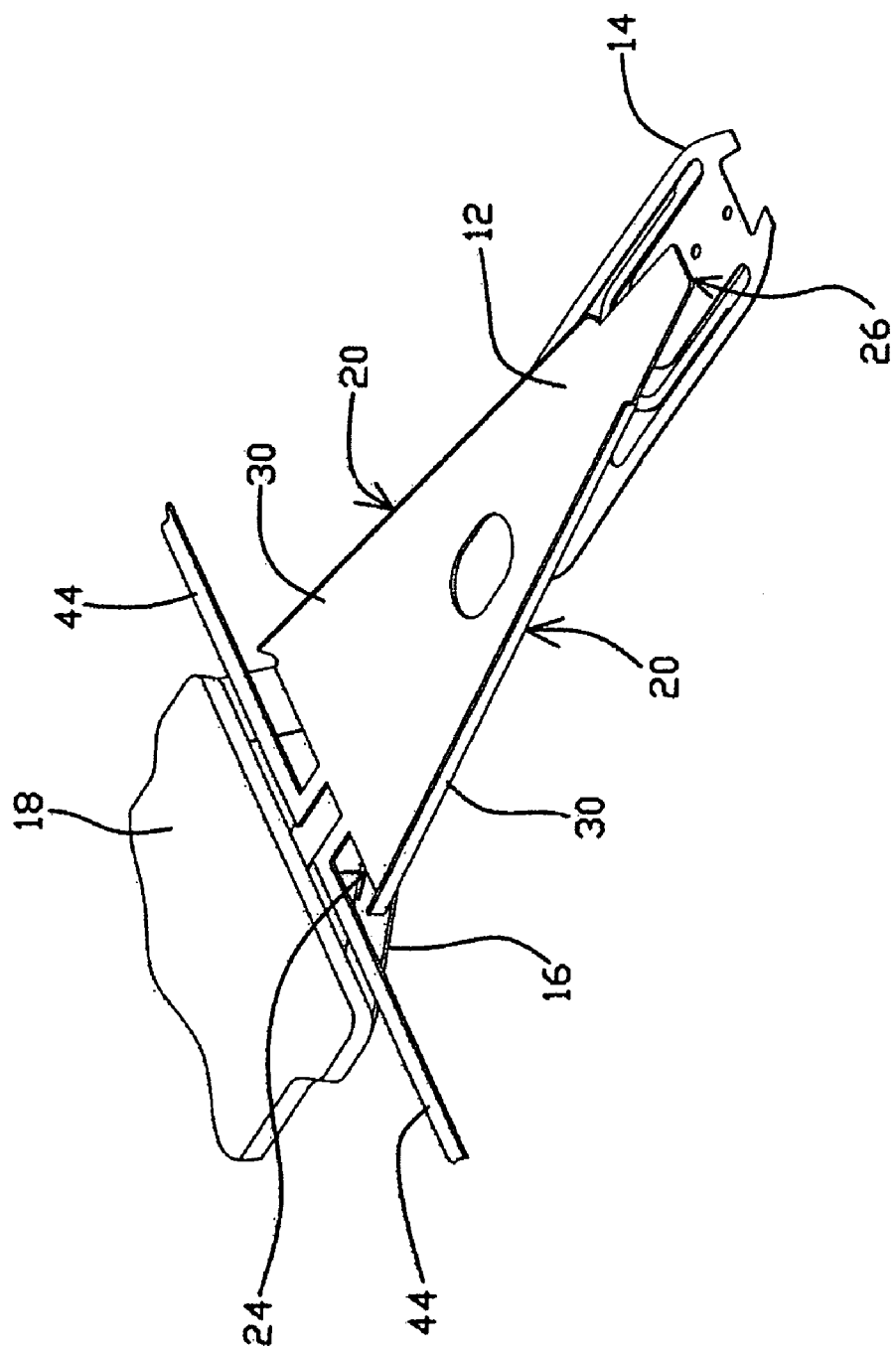
FIG. 4 is a perspective view of the beam component shown in FIG. 3 after attachment to a flexure, base plate, and spring component.

FIG. 4 is a perspective view of semi-finished suspension product 40 after assembly with other components of multi-piece head suspension 10. Flexure 14 is attached to distal end 26 of load beam 12, and spring component 16 is connected to proximal end 24 of load beam 12. Base plate 18 is mounted to the actuator mounting region (shown in FIG. 1) on spring component 16. Conventional methods such as welding can be used to attach beam region 12, flexure 14, spring component 16, and base plate 18.

Figure 5:
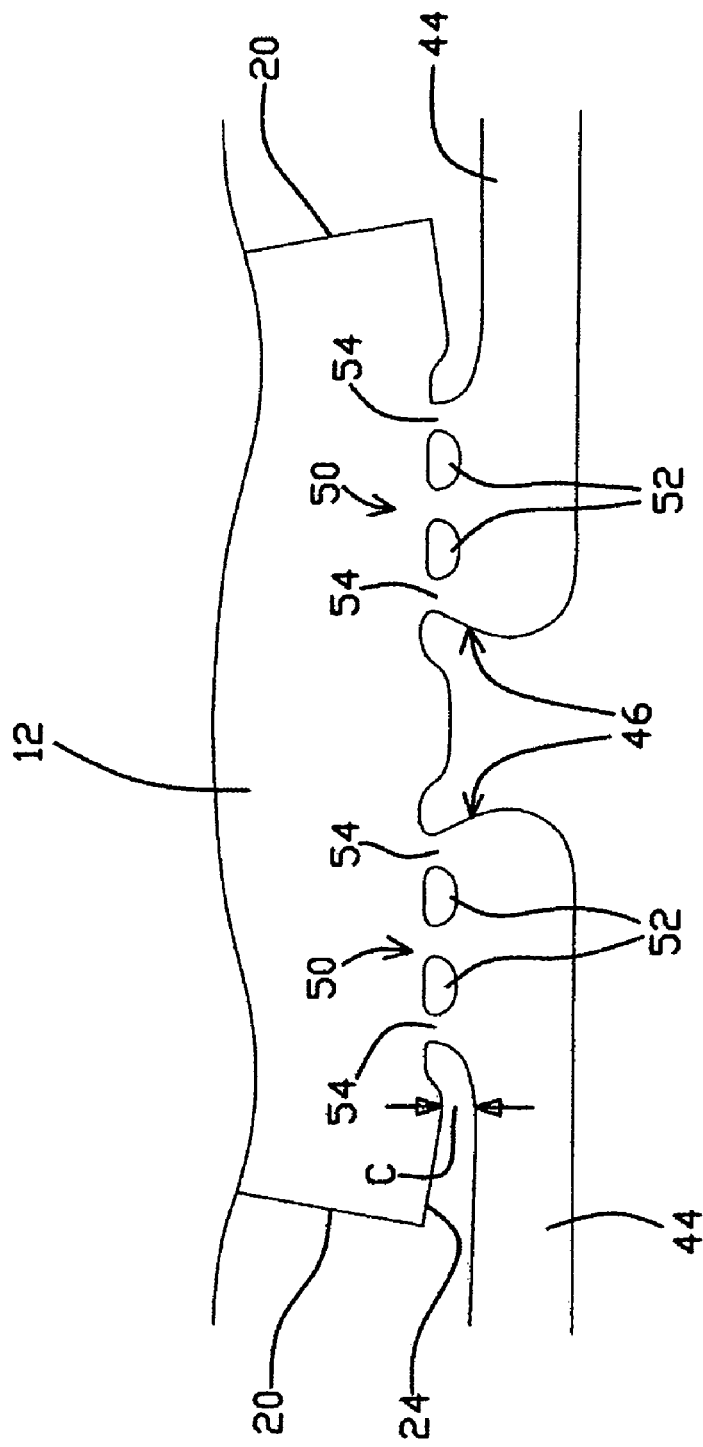
FIG. 5 is a plan view of tabs connecting arms of the beam carrier strip to the load beam according to an embodiment of the present invention.
Figure 6:
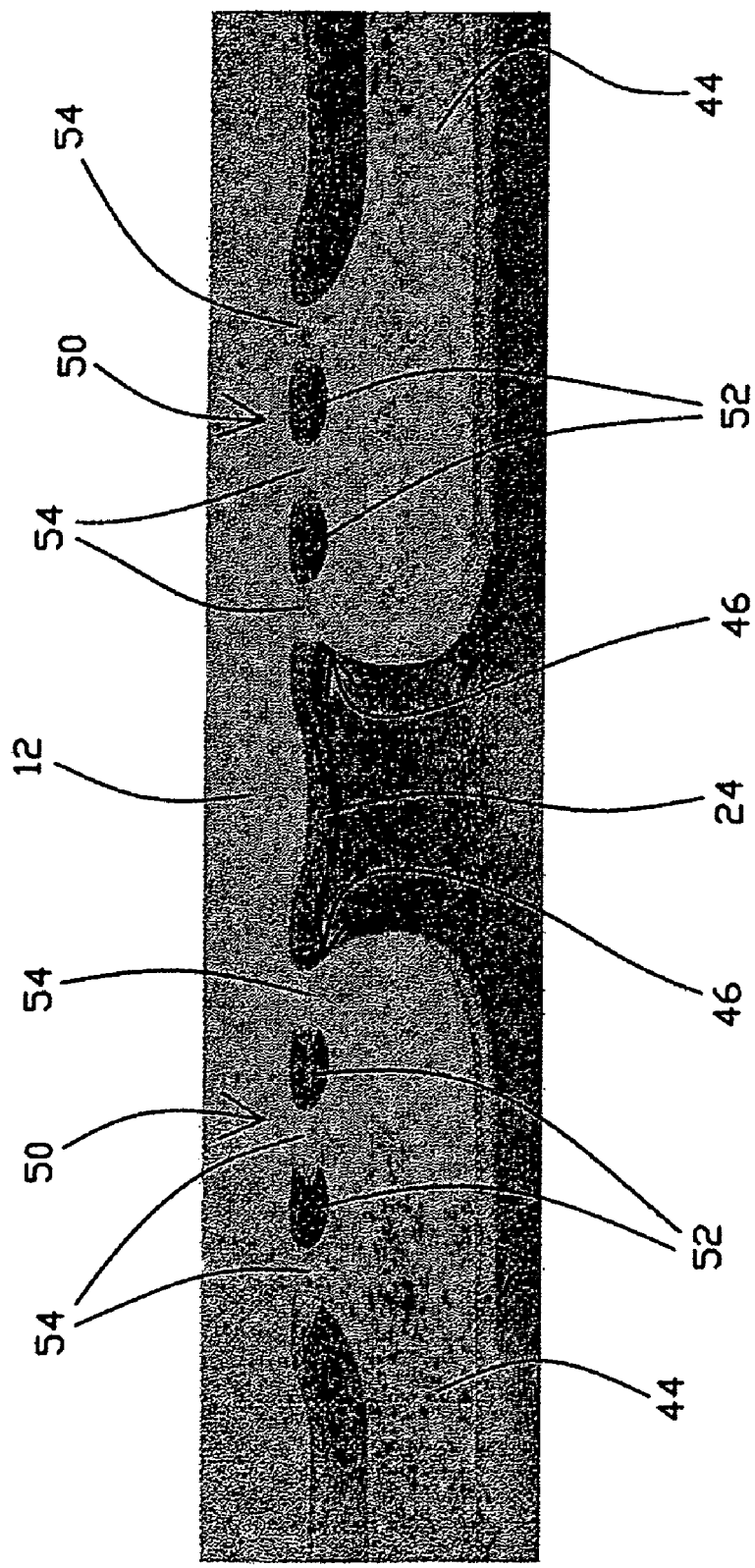
FIG. 6 is an optical image of the tabs connecting the arms of the beam carrier strip to the load beam.

FIG. 5 is a plan view and FIG. 6 is a perspective optical image of a portion of semi-finished suspension product 40, showing tabs 46 connecting arms 44 of beam carrier strip 42 to load beam 12 according to an embodiment of the present invention. Tabs 46 each include detaching region 50 at proximal end 24 that has a lower shear strength than other regions of tab 46. That is, the shear force that causes structural failure in detaching region 50 is less than the shear force that causes structural failure in other regions of tab 46. Detaching region 50 may be formed as shown with a plurality of apertures 52 that extend through each tab 46. In some embodiments, apertures 52 have a substantially trapezoidal profile with rounded or sharp corners. It will be appreciated that other shapes for apertures 52 are also contemplated by the present invention.

When apertures 52 are formed in tab 46, strips 54 connect the remaining portion of tab 46 to load beam 12 and have a lower shear strength than a tab 46 without apertures 52. Any number of apertures 52 may extend through each tab 46. In the embodiment shown, two apertures 52 are formed in detaching region 50 to produce three strips 54. Other manufacturing techniques may also be used to reduce the shear strength of tab 46 at detaching region 50 including, but not limited to, reducing a thickness and/or width of each tab 46 instead of or in addition to forming apertures 52 through tab 46. For example, the thickness of tab 46 may be reduced by partial etching through tab 46 in detaching region 50.

The major dimension of arms 44 extend substantially parallel to proximal end 24 and have a clearance C from proximal end 24. In some embodiments, clearance C is greater than about 0.125 mm to ensure that forming of apertures 52 does not affect arms 44.

Figure 7:
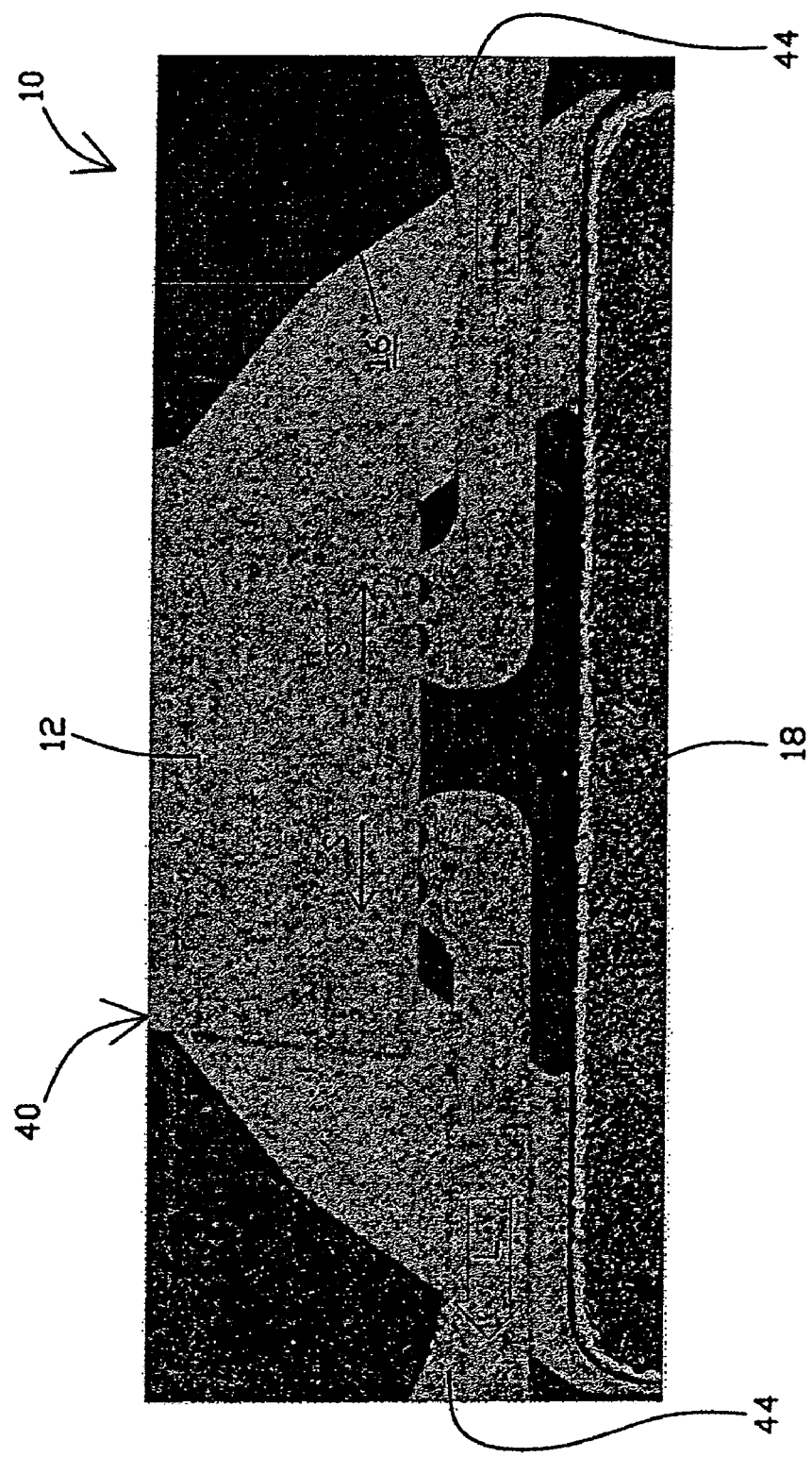
FIG. 7 is an optical image of a portion of the multi-piece head suspension, showing an applied load direction to detab the arms of the beam carrier strip from the load beam.
Figure 8:
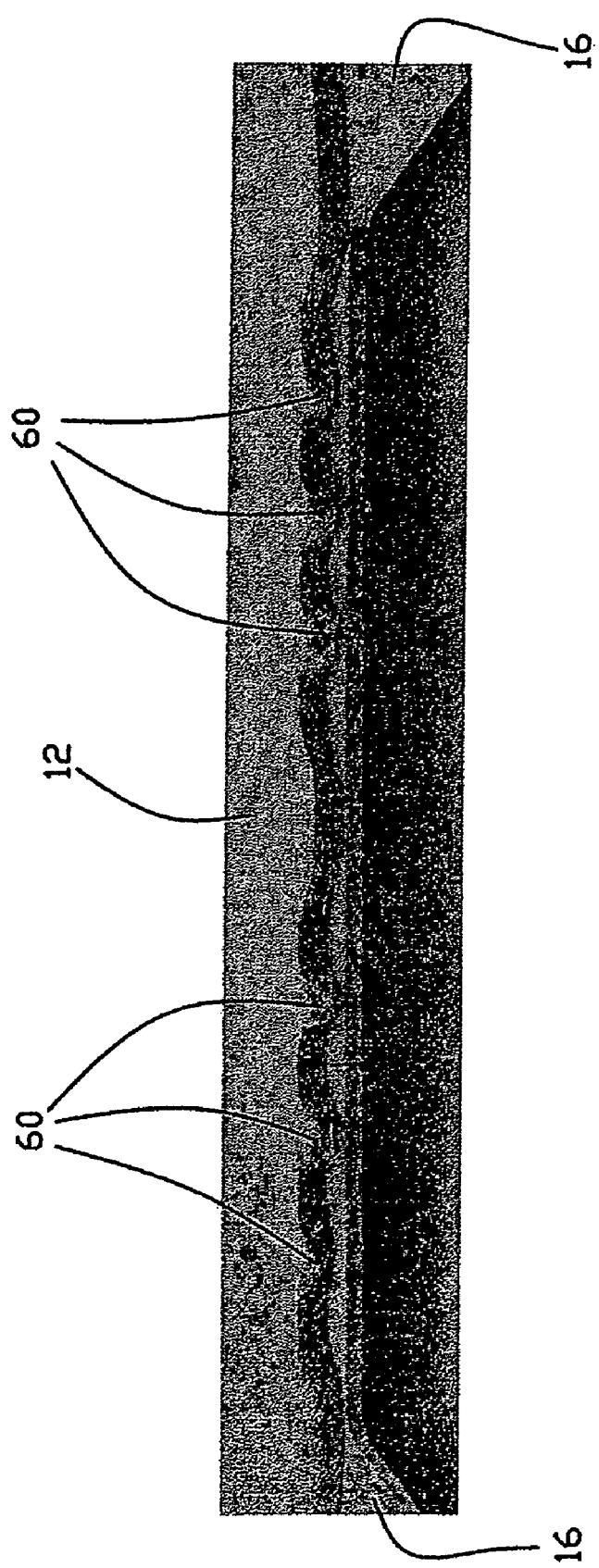
FIG. 8 is an optical image of the load beam after the arms are detabbed from the load beam.

In the next step of fabrication of multi-piece head suspension 10, beam carrier strip 42 is detached from load beam 12. According to the present invention, a shear load is applied to each tab 46 at detaching region 50 to cause each tab 46 to fracture at detaching region 50. FIG. 7 is an optical image view of a portion of multi-piece head suspension 10 showing semi-finished suspension component 40 attached to spring component 16. FIG. 7 also shows one method for applying a shear load to tabs 46, in which tensile load L is applied to arms 44 of beam carrier strip 42. Tensile load L generates a shear force S on each of tabs 46, which are oriented perpendicularly with respect to arms 46. In some embodiments, tensile load L is applied by clamping load beam 12 and applying a force along the major axis of arms 44 away from load beam 12. Tensile load L generates shear force S sufficient enough to fracture tabs 46 at detaching region 50, which is the region of tabs 46 having the lowest shear strength. FIG. 8 is an optical image of load beam 12 after arms 44 have been detabbed from the load beam 12, in which remnant tab footprints 60 are substantially aligned with a proximal edge of spring component 16. In other embodiments, remnant tab footprints 60 is recessed from the proximal edge of spring component 16. In further embodiments, spring component 16 is not present in the tab region. In any case, when arms 44 are detabbed from load beam 12, multi-piece head suspension 10 is as shown in FIG. 1.

In summary, the present invention relates to manufacturing a multi-piece head suspension assembly from a semi-finished suspension product. The semi-finished suspension product includes a load beam having two side edges, a distal end, and a proximal end opposite the distal end. The semi-finished suspension product also includes a beam carrier strip connected to the proximal end by one or more tabs. Each tab includes a detaching region that has a lower shear strength than other regions of the tab. Rails are formed on the side edges of the load beam, and the semi-finished suspension product is attached to a hinge assembly at the proximal end of the load beam. A shear load is applied to the one or more tabs to cause the one or more tabs to fracture at the detaching region. By detabbing the beam carrier strip from the load beam at the proximal end of the load beam, full side rails can be formed along the side edges of the load beam in a single step, which improves the resonance response of the load beam. In addition, the strain put on the load beam is reduced compared to designs with the beam carrier strip detabbed from the side edges of the load beam, thereby minimizing undesirable structural and cosmetic impacts to the load beam during fabrication.

Various modifications and additions can be made to the exemplary embodiments discussed without departing from the scope of the present invention. For example, while the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What is claimed is:

1. A method for manufacturing a multi-piece head suspension assembly from a semi-finished suspension product, wherein the semi-finished suspension product includes a load beam having two side edges, a distal end, and a proximal end opposite the distal end, wherein the semi-finished suspension product further includes a beam carrier strip connected to the proximal end by one or more tabs, and wherein each tab includes a detaching region that has a lower shear strength than other regions of the tab, the method comprising:
   forming rails on the side edges of the load beam;
   attaching the semi-finished suspension product to a spring component of a hinge assembly at the proximal end of the load beam; and
   applying a shear load to the one or more tabs to cause the tab to fracture at the detaching region.

2. The method of claim 1, wherein the beam carrier strip includes one or more arms each connected to the proximal end by the one or more tabs, wherein a major dimension of each arm is substantially parallel to the proximal end, and wherein applying a shear load to the one or more tabs comprises:
   applying a tensile load along the major dimension of the one or more arms.

3. The method of claim 1, wherein forming rails on the side edges of the load beam comprises:
   forming rails on the side edges of the load beam that extend from the proximal end to proximate the distal end.

4. The method of claim 1, wherein prior to applying a shear load to the one or more tabs, the method further comprises:
   attaching a flexure assembly to the distal end of the load beam.

5. A method for manufacturing a multi-piece head suspension assembly, the method comprising:
   forming a semi-finished suspension product including a load beam and a beam carrier strip, wherein the load beam includes two side edges, a distal end, and a proximal end opposite the distal end, and wherein the beam carrier strip is connected to the proximal end by one or more tabs;
   forming rails on the side edges of the load beam that extend from the proximate end to proximate the distal end;
   attaching the semi-finished suspension product to a spring component of a hinge assembly at the proximal end of the load beam; and
   applying a shear load to the one or more tabs to cause the one or more tabs to fracture.

6. The method of claim 5, wherein forming the semi-finished suspension product comprises:
   forming a detaching region in each of the one or more tabs that has a lower shear strength than other regions of the tab such that applying a shear load to the one or more tabs causes the one or more tabs to fracture at the detaching region.

7. The method of claim 6, wherein forming the detaching region in each of the one or more tabs comprises reducing a cross-sectional area of each of the one or more tabs in the detaching region.

8. The method of claim 7, wherein reducing the cross-sectional area of each of the one or more tabs in the detaching region comprises forming one or more apertures extending through the detaching region.

9. The method of claim 8, wherein the one or more apertures each have a substantially trapezoidal profile.

10. The method of claim 7, wherein reducing the cross-sectional area of each of the one or more tabs in the detaching region comprises reducing a thickness of the detaching region.

11. The method of claim 5, wherein the beam carrier strip includes one or more arms each connected to the proximal end by the one or more tabs, wherein a major dimension of each arm is substantially parallel to the proximal end, and wherein applying a shear load to the one or more tabs comprises:
   applying a tensile load along the major dimension of the one or more arms.

12. The method of claim 5, wherein prior to applying a shear load to the one or more tabs, the method further comprises:
   attaching a flexure assembly to the distal end of the load beam.

13. A method for forming a component in a multi-piece head suspension assembly, the method comprising:
   forming a semi-finished suspension product including a load beam and a beam carrier strip, wherein the load beam includes two side edges, a distal end, and a proximal end opposite the distal end, and wherein the beam carrier strip is connected to the proximal end by one or more tabs;
   forming rails on the side edges of the load beam that extend from the proximal end to proximate the distal end; and
   applying a shear load to the one or more tabs to cause the one or more tabs to fracture.

14. The method of claim 13, wherein the beam carrier strip includes one or more arms each connected to the proximal end by the one or more tabs, wherein a major dimension of each arm is substantially parallel to the proximal end, and wherein applying a shear load to the one or more tabs comprises:
   applying a tensile load along the major dimension of the one or more arms.

15. The method of claim 13, wherein forming the semi-finished suspension product further comprises:
   forming a detaching region in each of the one or more tabs that has a lower shear strength than other regions of the tab such that applying a shear load to the one or more tabs causes the one or more tabs to fracture at the detaching region.

16. The method of claim 15, wherein forming the detaching region in each of the one or more tabs comprises reducing a cross-sectional area of each of the one or more tabs in the detaching region.

17. The method of claim 16, wherein reducing the cross-sectional area of each of the one or more tabs in the detaching region comprises forming one or more apertures extending through the detaching region.

18. The method of claim 17, wherein the one or more apertures each have a substantially trapezoidal profile.

* * * * *